S. ROSENBERG.
TOOL FOR OPENING AND CLOSING CHAIN LINKS.
APPLICATION FILED JULY 17, 1914.
1,113,693.  Patented Oct. 13, 1914.
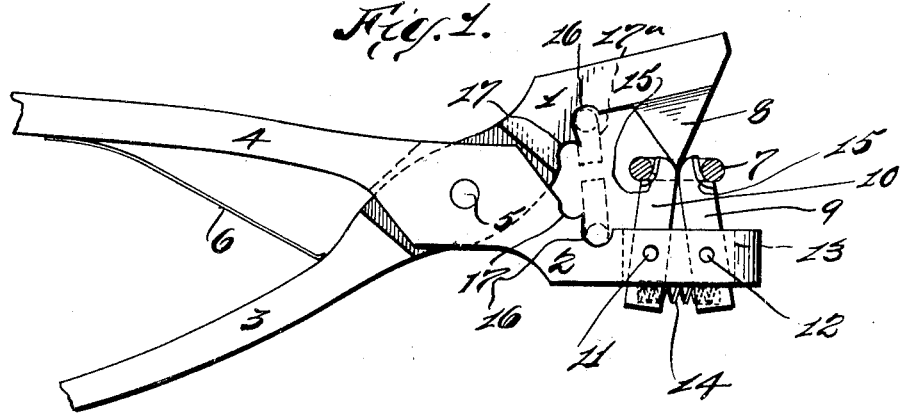
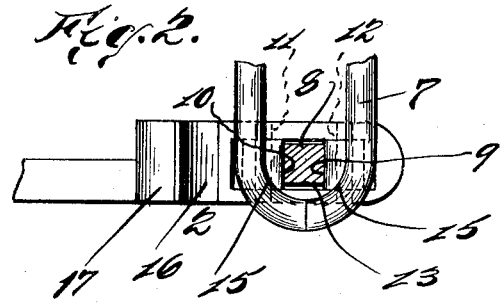
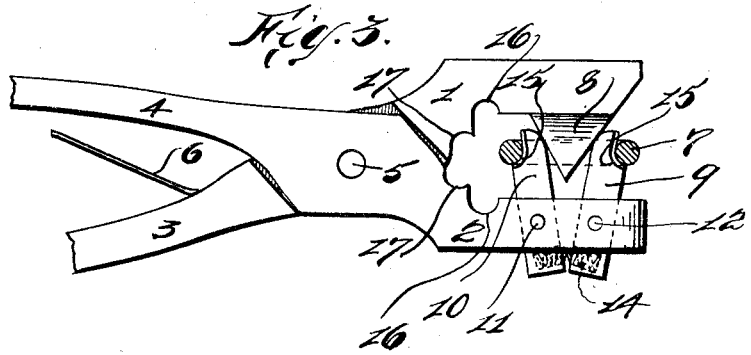
Witnesses
C. A. Jarvis
Edna Nathan
Inventor
Samuel Rosenberg.
Maurice Block
attorney.

UNITED STATES PATENT OFFICE.

SAMUEL ROSENBERG, OF NEW YORK, N. Y., ASSIGNOR TO NATIONAL CHAIN COMPANY, OF NEW YORK, N. Y., A CORPORATION OF NEW YORK.

TOOL FOR OPENING AND CLOSING CHAIN-LINKS.

1,113,693.

Specification of Letters Patent. Patented Oct. 13, 1914.

Application filed July 17, 1914. Serial No. 851,454.

*To all whom it may concern:*

Be it known that I, SAMUEL ROSENBERG, a citizen of the United States of America, residing at the city of New York, Bronx county, State of New York, have invented certain new and useful Improvements in Tools for Opening and Closing Chain-Links, of which the following is a full, clear, and exact description.

This invention relates to an improvement in chain-link opening and closing devices, the object being to provide a tool which is adapted to spread the links of a chain, that is, what are known as open links, or links made of one piece of material closed at one end, the other end consisting of abutting members not secured one to the other. Such links, for instance, are used to form chains for electroliers, etc. and it frequently happens that these chains have to be lengthened by adding links, or shortened by taking out some of the links. To add or take out links, the said links have to be spread or opened at the unsecured end; to add links to the chain the said links have to be first spread open, and then closed after having been joined to the chain. My improved device is adapted for both purposes, as will hereinafter be more fully explained.

I will now proceed to describe my invention in detail, the novel features of which I will point out in the appended claims, reference being had to the accompanying drawing, forming part hereof, wherein—

Figure 1 is a side view of my improved device, the handles being broken away; Fig. 2 is an enlarged fragmentary plan view of one of the jaw members, and Fig. 3 is a side view of the device in closed position.

My improved link opener and closer consists of a pair of jaw-members 1 and 2, provided with handles 3 and 4, respectively, the said jaw-members being pivotally connected at 5 and are kept normally separated by a spring 6. To spread the members of a link, indicated by 7, I provide the jaw-member 1 with a wedge shaped nose-piece 8 adapted to be forced between and separate or spread apart a pair of arms 9 and 10, pivotally connected as at 11 and 12, in a slot 13 in the jaw-member 2. A spring 14 acts to normally keep the arms 9 and 10 together at their upper ends as shown in Fig. 1.

In order that the arms 11 and 12 can be located as near to the extreme end of a link as possible (the said end being usually curved as shown in Fig. 2) I preferably recess the upper end of each arm as at 15 and curve the said recesses in order that the said arms can be positioned well into the rounded end of the link, as shown in Fig. 2.

In Fig. 1 the link 7 is illustrated as in position upon the jaws, after which the jaws are closed, thereby forcing the nose-piece between the arms 9 and 10 and spreading same, which action forces the members of the link apart as shown in Fig. 3.

Fig. 2 illustrates the device as applied to a wider link in which case the arms 9 and 10 will be slightly spread by the nose-piece before they come in contact with the link members.

To close a spread link, the said link will be placed in either of the recesses or pockets 16, 16 or 17, 17, according to its size, as shown by dotted lines 17ª in Fig. 1, the jaws 1 and 2 having been first separated to permit the spread link to be placed in the pockets or recesses 16, 16 or 17, 17. After the spread link has been placed in the recesses or pockets the jaw members will be closed, thereby forcing the members of the spread link together.

The device can be applied to a chain while said chain hangs in position.

The interposition of the pivoted arms 9 and 10 between the link and nose-piece 8 not only provides an effective spreading medium for opening the link, but also prevents abrading the inner surface of the link which would in many instances occur if a nose-piece were directly forced between the link-members to spread the same apart.

Having now described my invention, what I claim and desire to secure by Letters Patent is:

1. A chain-link spreader and closer, comprising pivotally connected jaw-members, a pair of arms pivotally connected to one of said jaw members and adapted for insertion into a link and means carried by the other jaw-member adapted to force said arms apart by the closing movement of said jaws.

2. A chain-link spreader and closer, comprising pivotally connected jaw-members, a pair of arms pivotally connected to one of said jaw members and adapted for insertion into a link and a wedge shaped nose-piece carried by the other jaw-member adapted to force said arms apart by the closing movement of said jaws.

3. A chain-link spreader and closer, comprising pivotally connected jaw-members, a pair of arms pivotally connected to one of said jaw-members and adapted for insertion into a link and a wedge shaped nose-piece carried by the other jaw-member adapted to force said arms apart by the closing movement of said jaws, each arm being provided at its upper end with a curved recess to receive the curved end of a link member.

4. A chain-link spreader and closer, comprising pivotally connected jaw-members, a pair of arms pivotally connected to one of said jaw-members and adapted for insertion into a link and a wedge shaped nose-piece carried by the other jaw-member adapted to force said arms apart by the closing movement of said jaws, each arm being provided at its upper end with a curved recess to receive the curved end of a link member, each jaw-member being provided with link retaining recesses.

5. A chain-link spreader and closer, comprising a pair of pivotally connected jaw-members, one of the jaw-members having an opening, a pair of arms located and pivotally secured in said opening, a spring normally maintaining the said arms in contact, and a nose-piece on the other jaw-member adapted to enter between said arms and spread the same apart.

6. A chain-link spreader and closer, comprising a pair of pivotally connected jaw-members, one of the jaw-members having an opening, a pair of arms located and pivotally secured in said opening, a spring normally maintaining the said arms in contact, each jaw-member being provided with link-retaining pockets, and a wedge-shaped nose-piece on the other jaw-member adapted to enter between said pivoted arms and spread the same apart.

Signed at New York city, N. Y., this 13th day of July, 1914.

SAMUEL ROSENBERG.

Witnesses:
CHAS. E. LUMLE,
ADOLPH E. WEIDHAAS.

---

Copies of this patent may be obtained for five cents each, by addressing the "Commissioner of Patents, Washington, D. C."